United States Patent
Pang

(10) Patent No.: US 11,158,183 B2
(45) Date of Patent: Oct. 26, 2021

(54) MOBILE TERMINAL BASED PLATFORM FOR EMERGENCY CALLING, RISK PREWARNING, AND ASKING FOR HELP BY ONE KEY

(71) Applicant: GUANGDONG BANACH BIG DATA TECHNOLOGY CO., LTD., Guangdong (CN)

(72) Inventor: Sulin Pang, Guangdong (CN)

(73) Assignee: GUANGDONG BANACH BIG DATA TECHNOLOGY CO., LTD., Guangdong (CN)

(*) Notice: Subject to any disclaimer, the term of this patent is extended or adjusted under 35 U.S.C. 154(b) by 690 days.

(21) Appl. No.: 16/068,364

(22) PCT Filed: Jan. 19, 2018

(86) PCT No.: PCT/CN2018/073419
§ 371 (c)(1),
(2) Date: Jul. 6, 2018

(87) PCT Pub. No.: WO2018/176999
PCT Pub. Date: Oct. 4, 2018

(65) Prior Publication Data
US 2021/0174666 A1    Jun. 10, 2021

(30) Foreign Application Priority Data
Mar. 29, 2017  (CN) .......................... 201710199056.8

(51) Int. Cl.
*H04M 11/04*      (2006.01)
*G08B 25/01*      (2006.01)
(Continued)

(52) U.S. Cl.
CPC ......... *G08B 25/016* (2013.01); *G08B 25/002* (2013.01); *G08B 25/006* (2013.01);
(Continued)

(58) Field of Classification Search
CPC .. G08B 25/016; G08B 25/002; G08B 25/006; G08B 25/10; H04W 4/06; H04W 4/90
(Continued)

(56) References Cited

U.S. PATENT DOCUMENTS

| | | | | |
|---|---|---|---|---|
| 7,511,614 | B2* | 3/2009 | Stilp | G08B 29/06 340/541 |
| 8,374,574 | B1* | 2/2013 | Alberth, Jr. | H04M 1/72433 455/404.1 |

(Continued)

FOREIGN PATENT DOCUMENTS

| | | |
|---|---|---|
| CN | 103338310 | 10/2013 |
| CN | 103634770 | 3/2014 |

(Continued)

OTHER PUBLICATIONS

"International Search Report (Form PCT/ISA/210)", dated Mar. 28, 2018, pp. 1-4.

*Primary Examiner* — Danh C Le
(74) *Attorney, Agent, or Firm* — JCIPRNET

(57) ABSTRACT

The present invention relates to a mobile terminal based platform for emergency calling, risk prewarning, and asking for help by one key. The platform comprises: a daily emergency calling module for a user asking for help to send a message asking for help to other users through the platform and to obtain a response from other users through the platform, and establishing a one-to-one response dialogue between the user asking for help and a user making the response; a prewarning information receiving and issuing module for issuance, enquiry, reception and dialogue of risk information and establishing a many-to-many dialogue among users who are concerned with the risk information; and a risk emergency calling module for a user confronted with an extreme risk event to send a risk message asking for help to a preset contact group through clicking one key in case of an urgent response and emergency calling.

11 Claims, 4 Drawing Sheets

(51) Int. Cl.
*H04W 4/90* (2018.01)
*G08B 25/00* (2006.01)
*G08B 25/10* (2006.01)
*H04W 4/06* (2009.01)

(52) U.S. Cl.
CPC .............. *G08B 25/10* (2013.01); *H04W 4/06* (2013.01); *H04W 4/90* (2018.02)

(58) Field of Classification Search
USPC ................................... 455/404.1, 550.1, 418
See application file for complete search history.

(56) References Cited

U.S. PATENT DOCUMENTS

| | | | | |
|---|---|---|---|---|
| 9,189,951 | B2* | 11/2015 | Stephens, Jr. | ......... H04W 4/029 |
| 10,049,077 | B2* | 8/2018 | Li | ........................... G06F 15/16 |
| 10,516,527 | B1* | 12/2019 | Machani | ............... H04L 9/0894 |
| 2010/0003950 | A1* | 1/2010 | Ray | ...................... H04M 3/5116 |
| | | | | 455/404.1 |
| 2013/0183924 | A1 | 7/2013 | Saigh et al. | |
| 2014/0244997 | A1* | 8/2014 | Goel | ................... H04W 12/084 |
| | | | | 713/155 |
| 2014/0253326 | A1* | 9/2014 | Cho | ....................... G08B 7/066 |
| | | | | 340/539.13 |
| 2014/0302810 | A1* | 10/2014 | Inha | .................. H04M 1/72421 |
| | | | | 455/404.1 |
| 2015/0271315 | A1* | 9/2015 | Larsson | ............ H04M 1/72469 |
| | | | | 455/404.1 |
| 2016/0212605 | A1* | 7/2016 | Clawson | ................. H04W 4/14 |

FOREIGN PATENT DOCUMENTS

| | | |
|---|---|---|
| CN | 104113630 | 10/2014 |
| CN | 106462824 | 2/2017 |
| CN | 106537952 | 3/2017 |
| CN | 107093157 | 8/2017 |

* cited by examiner

MOBILE TERMINAL BASED PLATFORM FOR EMERGENCY CALLING, RISK PREWARNING, AND ASKING FOR HELP BY ONE KEY

CROSS-REFERENCE TO RELATED APPLICATION

This application is a 371 of international application of PCT application serial no. PCT/CN2018/073419, filed on Jan. 19, 2018, which claims the priority benefit of China application no. 201710199056.8, filed on Mar. 29, 2017. The entirety of each of the abovementioned patent applications is hereby incorporated by reference herein and made a part of this specification.

TECHNICAL FIELD

The present invention relates to the field of routine rescue. More specifically, the present invention relates to a mobile terminal based platform for emergency calling, risk prewarning, and asking for help by one key.

BACKGROUND

The modern society has been increasingly called as a "risk society" that is a big data society. In the condition of globalized development, it becomes a significant characteristic of the present social development stage that global risks caused by human practice have occupied a dominant position. One evident characteristic of modernity resides in speedup of the pace, enlargement of the scope and unexampled depth of the social change. With the scope and the depth in which the social life and the nature are intervened are being unprecedentedly enlarged, new requirements are more and more, and new problems continuously arise in a great quantity. In such society, a method to satisfy the requirement can bring about a new requirement, and a method to solve the problem can bring about more problems.

In an actual sense, a structure of the risk society is not made up of elements such as classes and strata but made up of individual behavior subjects. That is, the order of the risk society is not graded or vertical but network-like and two-dimensionally extendable, and each individual is an "equalitarian" in the risk society. A risk is a result of psychological cognition, and occurrence of the concept of the risk society shows that apprehension of the risk of the human is deepened. It has been recognized that in the risk society a means or a method originally used to solve a problem may also cause a new problem and bring forth a new risk. The risk is not an ordered arrangement but assumes a transversely distributed non-structure state, and generation and propagation of the risk depend on procedural rules and criteria less and less. Meanwhile, limitation of professional knowledge in this case has been recognized. In addition, risk consciousness itself also becomes a kind of risk: risk consciousness tends to be uniformly distributed, and many risks are neglected after they are familiar to the public. As a result, such a difficult situation comes forth: though apprehension level of the risk is improved, response to the risk is insufficient.

Emergent management work and development of emergent software products are performed early in foreign countries, wherein emergent apparatuses in United States, Japan and Germany are relatively advanced.

Currently, hand-held terminal products for coping with sudden urgent events in China exhibit a single function, are not good in practicability, are poor in interactivity, and thus cannot realize issuance of risk information prewarning. Several common products of the same type in China are given as follows.

1. An ask-for-help message transmitter "Help Me! SOS" only has one single ask-for-help function, an email or a short message containing "satellite positioning information" and "positioning address" is sent via this application software to friends of a user in order to call fellows and escape from difficult or dangerous situations. This is a unidirectional ask-for-help manner, in which a person asking for help can only wait for rescue of a person being asked for help and cannot obtain any rescue information or measure to help himself, and in which the person asking for help who sends message asking for help cannot timely interact with a receiver receiving the message asking for help so that the person asking for help cannot be rescued or acquire effective responding measure timely and thus cannot give responding treatment or may give delayed responding treatment.

2. An on-site emergent treatment guideline "First Aid" enables appropriate self-rescue and mutual rescue when a professional rescuing team has not arrived at the site or cannot arrive at the site in case of emergency by integrating various types of knowledge about emergent treatments. However, a UI design and an interaction mode of the software are not humanized, and in view of various professional categorizations, the ordinary public who lacks professional knowledge often fails to make classification and discrimination when using the software and thus cannot give responding treatment or may give delayed responding treatment. Moreover, this manner can only depend on the person asking for help to help himself, and the person asking for help cannot correctly and timely send his message asking for help out and cannot timely obtain external rescue when the on-site emergent treatment guideline is unable to offer help.

3. An emergency call assistant is a tool that provides a detailed description of matters needing attention in dialing a phone number such as that for bandit alarm, emergent treatment, fire alarm, traffic accidents and the like when it is required to dial a phone number such as that for bandit alarm, emergent treatment, fire alarm, traffic accidents, weather forecast, number enquiry and the like in case of emergency, and a user can correctly dial an emergency number according to an operation instruction to improve dialing efficiency. This is a manner in which emergency rescue is obtained by dialing a conventional rescue number, and although it is possible to ask for help and perform interaction, such conventional rescue number corresponds to a conventional rescue type, i.e., each rescue number corresponds to one kind or several kinds of rescue, but a person being asked for help of the rescue number is very difficult or even impossible to provide rescue of other types than the corresponding rescue. However, there are a variety of rescue types in real life, while the rescue number of other types of rescue than the conventional rescue cannot function and thus cannot provide timely rescue.

4. An emergency calling and ask-for-help software "ADO SOS V1.0" is a software for displaying message asking for help to another person in case of emergency, in which a screen is swept leftward or rightward to change its color and swept upward or downward to change displayed words, the words to be displayed can be input through a menu/settings, and a language of Chinese or English can be selected using a locale of a mobile phone. This software is designed to send the message asking for help out, but is still absent in interaction between a person asking for help and a person being asked for help, resulting in that the person asking for help cannot be rescued or acquire effective responding measure timely and thus cannot give responding treatment or may give delayed responding treatment. In short, the software has a single function.

5. A smart call-for-help phone is a dedicated mobile phone designed for old people, and once the old people have an accident suddenly, a "999" emergency key may be pressed directly and a "999" control center can rapidly lock a position of a person calling for help through a positioning system of the call-for-help phone no matter where he is in Beijing. Obviously, this mobile phone has a narrow scope of function and usage.

6. An emergent alert is an application program capable of tracking a tour route of a user and sending an accident report and an orientation of the user to a designated phone number according to a predetermined setting when the user has an unexpected accident. This is a manner in which information of the unexpected accident is sent to the designated phone number in a passive way, but interaction between a person asking for help and a person being asked for help cannot be realized, resulting in that the person asking for help cannot be rescued or acquire effective responding measure timely and thus cannot give responding treatment or may give delayed responding treatment. In short, the application program has a single function.

Each of the above-mentioned manners for emergency calling for sudden events has a single function and cannot realize effective ask-for-help interaction, it is only limited to ask for help by a call, or what is more, a conventional rescue call even if ask-for-help interaction is possible to be realized, and the available urgent help will be very limited.

At present, theoretical and application research of handheld emergency rescue and prewarning on the mobile internet is still absent in the world, and a daily emergency calling system has not been seen yet. Therefore, a design and algorithm research of the "mobile terminal based platform for emergency calling, ask-for-help and risk prewarning" can fill up a gap in this field of research and application of the international academia, is very large in either its theoretical research significance or practical application value, and thus becomes an application trend of big data in social application development.

SUMMARY OF THE INVENTION

In order to overcome at least one of the above-described disadvantages (deficiencies) in the prior art, the present invention provides a mobile terminal based platform for emergency calling, risk prewarning, and asking for help by one key that can realize an interaction between a person asking for help and a person being asked for help based on a risk demand for help.

To solve the above technical problems, the technical solution of the present invention is as follows:

a mobile terminal based platform for emergency calling, risk prewarning, and asking for help by one key comprising:

a daily emergency calling module for a person asking for help to send a message asking for help to other users through the platform and to obtain a response from the other users through the platform, and establishing a one-to-one response dialogue between the person asking for help and a user making the response;

a prewarning information receiving and issuing module for issuance, enquiry, reception and dialogue of risk information, and establishing a many-to-many dialogue among users who is concerned with the risk information; and a risk emergency calling module for a user confronted with an extreme risk event to send a risk message asking for help to a preset contact group through clicking one key in case of an urgent response and emergency calling.

The present invention designs and realizes the daily emergency calling module, the prewarning information receiving and issuing module and the risk emergency calling module, and completes sending, enquiring, receiving, responding, dialoguing, describing and one key alarm sending of a daily emergency calling message, the risk big data prewarning information, the emergency calling message of the extreme risk event and the like. The system enables the emergency calling to be expanded to bidirectional interaction instead of only having a function of unidirectional ask-for-help. A user of the platform is also supported to issue a message asking for help to seek help and issue risk information to remind other users of the system, and the user is also supported to obtain the message asking for help and the risk information in an enquiry manner so that not only the user can provide urgent help for the person asking for help but also the user is allowed to know the risk information condition in advance in order to early make risk plans and response measures. It is also possible to timely contact the preset contact group through the risk emergency calling module in the extreme risk event so as to obtain the most effective emergency rescue instantly.

In the above solution, the message asking for help includes personal information of the user, a geographic position of the user and an ask-for-help content, and information of the response dialogue at least includes personal information of the user making the response, a text content of a response message, a geographic position of the user making the response, and a distance information of the user asking for help and the user making the response. The message asking for help includes the personal information and the geographic position, it can be used to locate the position of the user, and it is convenient for the external surroundings to offer individualized help in accordance with the geographic position. The personal information of the user making the response includes the geographic position thereof and the distance information between the user making the response and the user issuing the message asking for help, and it is convenient for the user issuing the message asking for help to know a detailed condition of the user making the response and thus have an effective dialogue and interaction with the user making the response so that the user making the response can offer more individualized help for the user issuing the message asking for help.

In the above solution, the daily emergency calling module comprises:

a message asking for help sending module for the user asking for help to send the message asking for help to the other users on the platform through the platform, and the automatically sending a geographic position of the user asking for help;

a response message module by which users on the platform offer a message response to the user asking for help after viewing the message asking for help; and a one-to-one dialogue module for the user asking for help and the person making the response to carry out a one-to-one information dialogue on the platform.

In the above solution, the prewarning information receiving and issuing module comprises:

a prewarning information issuing module for the user to issue risk prewarning information through the platform, the risk prewarning information being displayed for the other users to view or enquire after it is issued through the platform;

a risk information receiving module for the user (all the users on the platform) to receive, on the platform, the risk information and the prewarning information issued by other users;

a risk information enquiry module for all users on the platform to enquire issued risk prewarning information; and a many-to-many dialogue module for establishing a many-to-many interactive dialogue with respect to the risk prewarning information. The prewarning information issuing module is convenient for the user to issue the risk information that is encountered daily through the platform to remind the surrounding crowd on the platform to pay attention to and prepare for the risk response in advance. Meanwhile, the risk information receiving module is convenient for the user to obtain the risk prewarning information in an enquiry reception manner. On one hand, the dangerous condition can be known in advance and risk response measures can be prepared ahead of time, and on the other hand, the concerned persons (including an issuer) can be facilitated through the many-to-many dialogue module to conduct the many-to-many interactive dialogue with regard to the information issued by the issuer to discuss or deeply understand the risk information. In addition, the risk information enquiry module can be used by users on the platform to enquire the issued risk information in order to know the risk conditions of the perimeter or a designated place or position that are desired to be known in advance so that a preventive preparation of the risk response can be made ahead of time.

In the above solution, a risk level classification module is used to classify levels of the risk prewarning information issued by the user, and a classified risk prewarning information affixed with a risk level is issued through the platform after identification and measurement of the risk.

When the user issues the risk prewarning information, the system platform automatically accesses a background database, conducts a classification according to a risk degree description of a risk event of the user, and makes prewarning correspondingly.

In the above solution, the risk prewarning information includes a picture and/or video of the risk event, a literal description of the risk event, and a geographic position of the risk event.

In the above solution, the risk emergency calling module comprises:

a one-key information ask-for-help module for sending urgent risk information and a personal information and location to a target rescue system and the preset contact group by pressing one click key after entering the urgent risk information; and a one-key alarm ask-for-help module for sending personal information (including name, gender, age, phone number, identity card number, domestic address, parents, spouses or the like) and a geographic position information location of the user to the target rescue system and the preset contact group to achieve an effect of one-key ask-for-help by an operation of pressing the one click key.

In the above solution, the one click key includes a 911 bandit alarm system key, a 911 medical rescue system key, a 911 traffic accident system key, a 911 fire alarm system key to be connected to various alarm systems, and a group key to be connected to a mobile terminal of the preset contact group (e.g., a group constituted by family members or intimate friends).

The risk emergency calling module can help the user confronted with the extreme risk event to issue a call for help by one key after describing the risk information in case of sufficient time, or directly send the personal information, a current position and words like "emergency risk" to an emergency rescue department, family members or intimate friends by pressing an icon of the "one click key" in a very urgent case, so that the person asking for help can send the risk information to the emergency rescue department, the family members or the intimate friends in the shortest time in order to obtain the most effective emergency rescue instantly.

In the above solution, the platform further comprises a data statistics and summarization module for big data statistics, summarization and analysis of all information received on the platform for a manager of the platform to make enquiry and information maintenance.

In the above solution, the data statistics and summarization module specifically comprises:

a data statistics module for the platform to automatically perform classification, statistics and analysis of big data in a background database; and a data summarization module for the platform to automatically perform classification, summarization and analysis of the big data in the background database.

The data statistics and summarization module performs statistics, summarization and analysis of the big data according to sending, reception, dialogue and the like of information of the mobile terminal, and can conduct investigation, analysis and digging on the big data of the users.

In the above solution, the platform further includes a personal information management module for the user's registration on the platform and information maintenance.

As compared with the prior art, the technical solution of the present invention has the following advantageous effects.

The present invention designs and realizes the daily emergency calling module, the prewarning information receiving and issuing module and the risk emergency calling module, and completes sending, enquiring, receiving, responding, dialoguing, describing and one key alarm sending (911, family members, or intimate friends) of a daily emergency calling message, the risk big data prewarning information, the emergency calling message of the extreme risk event and the like. The system enables the emergency calling to achieve unidirectional ask-for-help and be expanded to bidirectional interaction. A user of the platform is also supported to issue a message asking for help to seek help and issue risk information to remind other users of the system, the user is also supported to obtain the message asking for help and the risk information in an enquiry manner, and the system further automatically offers risk level prewarning so that not only users can provide urgent help for the person asking for help but also the user is allowed to know the risk information condition in advance in order to early make risk emergency plans and response measures. In addition, the user confronted with the extreme risk event is helped to issue a call for help by one key after describing the risk information in case of sufficient time, or directly send the personal information, a current position and words like "emergency risk" to an emergency rescue department (a plurality of departments are possible), a family member (a plurality of family members are possible) or an intimate friend (a plurality of intimate friends are possible) by pressing a "one key alarm" icon, i.e., an icon for one key ask-for-help, in a very urgent case, so that the person asking for help can send the risk information to the emergency rescue department, the family members or the intimate friends in the shortest time in order to obtain the most effective emergency rescue instantly. Finally, statistics, summarization and analysis of the big data are performed in the background according to sending, reception, dialogue and the like of information of the mobile terminal, and investigation, analysis and digging on the big data of the users can be conducted.

DETAILED DESCRIPTION OF THE PREFERRED EMBODIMENT

Figure 1:
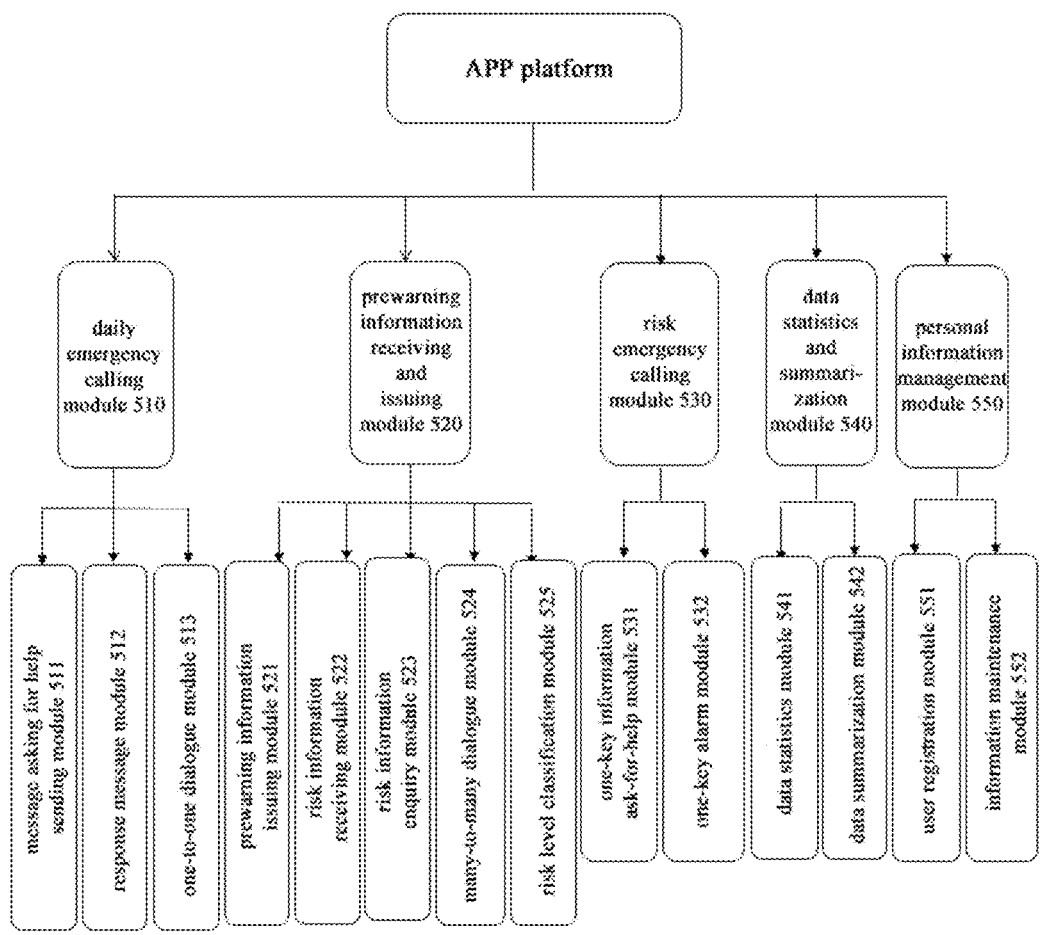
FIG. 1 is a framework diagram of a specific embodiment of an emergency calling and risk big data prewarning system according to the present invention.

The accompanying drawings are intended for exemplary illustration, but cannot be understood as a restriction to the present application.

In order to illustrate the present embodiment better, some components in the accompanying drawings may be omitted, enlarged or reduced and will not necessarily represent sizes of an actual product.

For those skilled in the art, it is to be understood that some commonly known structures in the drawings and description thereof may be omitted.

Moreover, in the description of the present invention, it is to be understood that the terms "first" and "second" are intended for the purpose of description but cannot be understood as indicating or implying relative importance or suggesting the number of technical features. As a result, each of features defined by "first" or "second" may explicitly or implicitly includes one or more of such features. In the description of the present invention, "a plurality of" means two or more than two, unless it is otherwise stated.

In the description of the present invention, it is to be note that the terms "install" and "connect" should be understood broadly unless otherwise expressly prescribed or defined, for example, "connected" may be fixedly connected, detachably connected, or integrally connected, may be mechanically connected or electrical connected, may be directly connected or indirectly connected through an intermediate medium, or may be referred to internal communication of two members. For those ordinarily skilled in the art, specific meanings of the above terms can be understood according to specific circumstances.

The technical solution of the present invention will be further described below in connection with the accompanying drawings and the embodiment.

Embodiment 1

As shown in FIG. 1, it is a framework diagram of a specific embodiment of a mobile terminal based platform for emergency calling, risk prewarning, and asking for help by one key according to the present invention. With reference to FIG. 1, the mobile terminal based platform for emergency calling, risk prewarning, and asking for help by one key according to the present specific embodiment includes a daily emergency calling module 510, a prewarning information receiving and issuing module 520, a risk emergency calling module 530, a data statistics and summarization module 540 and a personal information management module 550. Respective modules are specifically given as follows.

(1) The Personal Information Management Module 550

This module is particularly used for registration, system logging, personal information input, personal information maintenance and the like of a new user.

The personal information management module 550 includes a user registration module 551 and an information maintenance module 552.

The user registration module 551 is for a registration before the user uses the platform, and it is divided into ordinary user registration and VIP user registration. An ordinary user registers his personal information on an APP platform and inputs name, address, work unit, phone number and real head portrait (photo) of the user to finish registration. A VIP user registers his detailed personal information on the APP platform and inputs the name, gender, address, work unit, phone number, domestic address, main family members, contact information of main family members, identity card number, real head portrait (photo), etc., of the user to finish registration.

In specific applications, authorities of the ordinary user and the VIP user can be delimited. The ordinary user may use two functions of the daily emergency calling module 510 and the prewarning information receiving and issuing module 520 in the platform. The VIP user may use the risk emergency calling module 530 in the extreme risk conditions in addition to the two functions of the daily emergency calling module 510 and the prewarning information receiving and issuing module 520.

Furthermore, when a new user is registered, information requested to be input for the personal information management module 550 may be different from those requested to be input for other different modules, for example, the daily emergency calling module 510 requests the user to input his name, address, work unit, phone number and real head portrait (photo) of the user; the risk emergency calling module 530 requests the user to input the name, domestic address, work unit, phone number, email box, identity card number, name of spouse, work unit of spouse, phone number of spouse, identity card number of spouse, and real head portrait (photo), etc., of the user; and the prewarning information receiving and issuing module 520 and the data statistics and summarization module 540 requests the new user to input his name, gender, phone number, email box and real head portrait (photo), etc.

The information maintenance module 552 is used for the user to update personal information.

(2) The daily emergency calling module 510 for a user asking for help to send a message asking for help to other users through the platform and to obtain a response from other users through the platform, and establishing a one-to-one response dialogue between the user asking for help and a user making the response.

In the daily urgent ask-for-help module 510, the message asking for help includes, but is not limited to, personal information of the user, a text content (the text content may be a character, a picture or a video) of the user and a geographic position of the user, and the response message includes, but is not limited to, personal information of the user making the response, a text content of the response message (the text content of the response message may be a character, a picture or a video), a geographic position of the user making the response, and a distance information of the user asking for help and the user making the response, the distance information being preferably straight-line distance information.

In particular, the personal information can be input to the system and stored in the system when the user performs new user registration using the personal information management module 550, and when the user sends the message asking for help by use of the daily emergency calling module 510 and the user making the response sends the response message based on the message asking for help, the personal information stored in the system can be directly called without the need to reenter the personal information each time he asks for help.

In particular, the geographic position of the user asking for help and the geographic position of the user making the response are directly generated by a map software, and the geographic position to be sent out, whether it is the geographic position of the user asking for help or the user making the response, are also directly generated using the map software; the geographic positions of the user asking for help and the user making the response are directly displayed in the map, and a movement locus of the user asking for help after sending the message asking for help is simultaneously displayed in a corresponding map (i.e., a dynamic moving map) of the user asking for help.

In particular, the distance information between the user making the response and the user issuing the message asking for help can be calculated by an algorithm built in the daily emergency calling module 510.

In particular, the ask-for-help content sent by the user may be in forms of pictures, characters, videos, etc.

In a specific implementation, the daily emergency calling module 510 specifically includes the following modules.

A message asking for help sending module 511 is used for the user asking for help to send the message asking for help to other users on the platform through the platform and is used to automatically send the geographic position of the user asking for help. In the message asking for help sending module 511, transferring to other users by the platform can be based on a certain condition, for example, other uses should be in the vicinity of the user issuing the message asking for help, and in specific implementation, it is possible to set a circular range that takes the geographic position of the user issuing the message asking for help as a center of a circle and has a certain distance as a radius, as an extent of the vicinity.

A response message module 512 is used for the user on the platform to reply a message response to the user asking for help after viewing the message asking for help. The replied message response is usually effective measures for the message asking for help or information capable of offering help to the user asking for help. After the response message is sent, the personal information (including name, gender, phone number, etc.) of the person making the response, text or picture of the response message, and the geographic position and rectilinear distance of the person making the response are also automatically sent to the platform so that the user asking for help can comprehensively determine and choose which user making the response to enter the dialogue for benefit of the user asking for help.

A one-to-one dialogue module 513 is used for the user asking for help and the user making the response to carry out a one-to-one information dialogue on the platform. The user asking for help may concurrently have a one-to-one dialogue with a plurality of persons making responses respectively, but every one of the persons making responses cannot view information of another one. Meanwhile, the user asking for help may choose one user making the response to conduct the one-to-one interactive dialogue depending on his personal preference according to the response message of other users, at this time, the one-to-one dialogue module 513 stores response messages of all the users making responses into a background database for the user asking for help to choose arbitrarily and freely. When the user asking for help has chosen help offered by a certain user making the response, other users making responses will receive a refusal message. However, if the user asking for help abandons help of the chosen user making the response, the user asking for help may turn to conduct a one-to-one interactive dialogue with the next user making the response and decide whether to accept his help.

Figure 2:
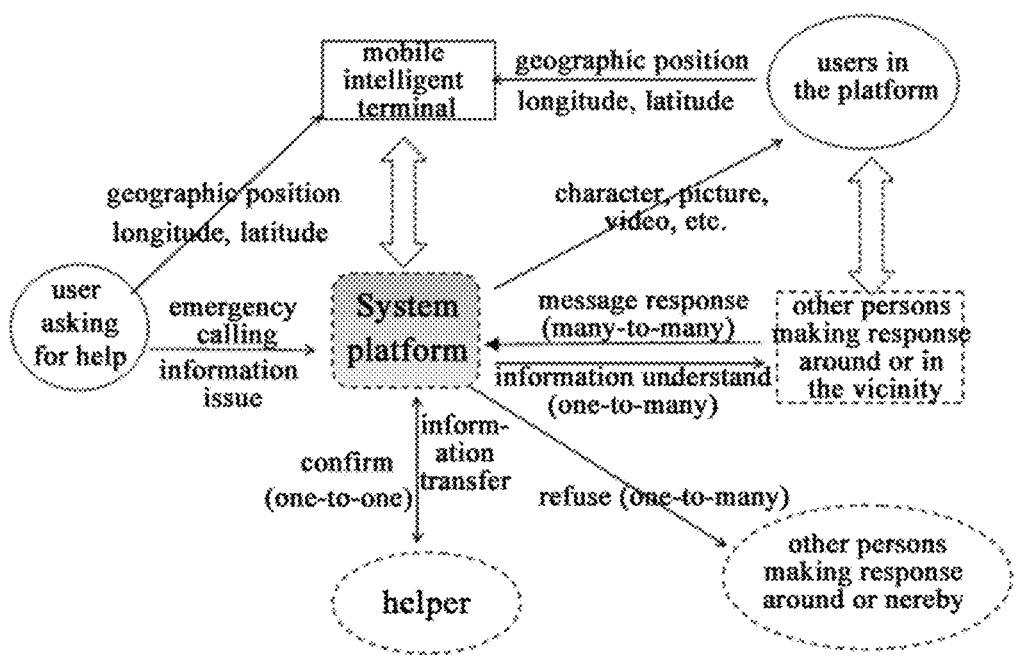
FIG. 2 is a flow diagram of a specific implementation of a daily emergency calling module according to the present invention.

The daily emergency calling module 510 is specifically used for various emergencies faced by people in their daily lives, for example, a person comes out from a cinema, encounters a heavy rain for which an umbrella is required to be borrowed or bought, and expects a kindhearted person or an umbrella seller nearby to deliver it to him; a person walks in a street to hurriedly find a public toilet, and he needs an adjacent person familiar with the topography to inform him of a position or orientation of the public toilet; for curing a serious critical patient, a hospital issues exigent blood donation information requiring blood donors of the same blood type on the platform, and so on. As shown in FIG. 2, in the specific implementation, the daily emergency calling module 510 is mainly used for the following.

1) The user (referred to as the user asking for help hereinafter) issues, through the platform, a text, a picture, a video, etc. of the message asking for help desired to be exigently sent by clicking the "daily emergency calling" function of the system on the mobile terminal. The personal information (including name, gender, phone number, email box, etc.) and the geographic position of the user asking for help are also automatically displayed by the platform, and the platform automatically finds persons nearby and sends the information, pictures and video for emergency calling out;

2) The system platform will generate a many-to-one response, that is, the user asking for help will receive response messages sent from a plurality of different users (called the persons offering help herein), the response message includes the personal information (including name, gender, phone number, etc.) of the person offering help, a text or picture of the response message, the geographic position, the distance, etc., and the user asking for help may simultaneously conduct interactive information dialogues with a plurality of persons offering help;

3) When the user asking for help confirms to choose one of helps suitable for his urgent requirement depending on his individual preference, the system will enter a one-to-one interactive dialogue;

4) Once the user asking for help decides to accept the help of the person offering help, the system will automatically send a courtesy message "the person offering help has been found, thank you!" to the other persons making response;

5) However, if the user asking for help abandons the help of the person offering help, the user asking for help may turn to conduct a one-to-one interactive dialogue with the next user offering help;

6) Steps 3), 4) and 5) are repeated until the user asking for help finally determines a certain person offering help or ultimately fails to find any person offering help;

7) If the user asking for help cannot find any person offering help eventually, he can re-click the "daily emergency calling" function to perform the same operation mentioned above.

(3) The Prewarning Information Receiving and Issuing Module 520

This module is used for issuance, enquiry, reception and dialogue of risk information and for establishing a many-to-many dialogue among users who are concerned with the risk information, and can achieve a many-to-many interactive dialogue among all participants that are concerned with the risk information on the platform.

The prewarning information receiving and issuing module 520 specifically includes the following.

A prewarning information issuing module 521 for the user to issue risk prewarning information through the platform, and the risk prewarning information is displayed for the other users to view or enquire after it is issued through the platform. The user takes pictures or records videos of risk weak spots, risk exposure spots and various risk events found nearby using a mobile phone, sends the pictures or videos onto the APP platform and may enter a literal explanatory description, and the system platform automatically sends a geographic position of a risk site or an accident site out to remind the users on the platform to pay attention.

A risk information receiving module 522 is used for a user to receive, on the platform, the risk information and the warning information issued from other users.

A risk information enquiry module 523 is used for all users on the platform to enquire the issued risk prewarning information. The risk prewarning information can be obtained through an enquiry function and can be browsed and read to know in advance risk conditions of the perimeter or a designated place or position, and then preparations for preventing and responding to the risk can be made previously.

A many-to-many dialogue module 524 is used to establish a many-to-many interactive dialogue with respect to the risk prewarning information. Concerning persons may conduct the many-to-many interactive dialogue with respect to the information issued by an issuer mutually among them (including the issuer) to discuss or deeply understand the risk prewarning information.

A risk level classification module 525 divides the risk issued by the user into four levels: "extreme risk", "high risk", "medium risk" and "low risk". When the user encountering the risk event issues the risk on the platform, the system platforms automatically uses the risk level classification module 525 to classify levels of the risk information (four levels), then carries on risk identification and measurement, and then carries out the prewarning and issues the prewarning information according to the level of the identified risk. The risk level classification and risk measurements stored in a background database are as follows:

| Type of risks | Description for degree of risks | Risk measurement (possibility of risk) |
| --- | --- | --- |
| extreme risk | an extreme abnormal state or an extreme obstructive condition exist in the content of the information, and the event is described to be absolutely at risk | 95%-100% |
| high risk | a high abnormal state or a high obstructive condition exist in the content of the information, and the event is described to be at risk | 80%-94% |
| medium risk | a medium abnormal state or a medium obstructive condition exist in the content of the information, and the event is described to be at risk but it's not too dangerous | 50%-79% |
| low risk | a low abnormal state or a low obstructive condition exist in the content of the information, and the event is described to have a small risk | 1%-49% |

When the user issues the risk information, the system platform automatically accesses the background database, and performs the corresponding prewarning according to the description of the user for the degree of risk of the risk event.

Figure 4:
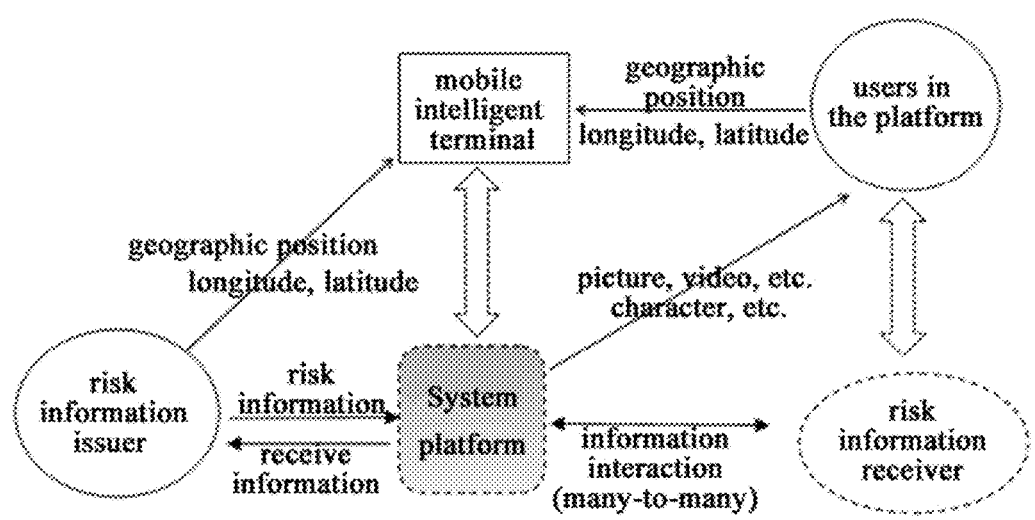
FIG. 4 is a flow diagram of a specific implementation of an information receiving and issuing module according to the present invention.

As shown in FIG. 4, the prewarning information receiving and issuing module 520 is mainly applied to the following situations.

1) In daily life, when the risk weak spots or the risk exposure spots are found, people may take pictures or records videos of the risk weak spots, the risk exposure spots found nearby or various encountered risks events as well as obstacle spots, interruptions (artificially disposed obstacles or interruptions cause by collapse or sinking, etc.) of various roads using a mobile phone, may send descriptive texts, pictures or videos onto the system platform by the prewarning information issuing module 521 in the prewarning information receiving and issuing module 520, may separately enter a literal explanatory description and send it on the platform, and may send the taken pictures and recorded videos while sending the literal explanatory description. At the same time, the system platform automatically sends the geographic position of the information issuer out to remind those in the perimeter or those who will pass by to pay attention. In addition, the users on the system platform can use the many-to-many dialogue module 524 to conduct a many-to-many information interaction among them (including the issuers) with respect to the certain "risk information" sent out to understand risk conditions or to investigate risk doubtful points.

2) The user may receive, on the platform, the risk information and prewarning information issued from other users through an information receiving function in the risk information receiving module 522.

3) The user may search surroundings or designated places, roads, buildings, locations, tourist areas, scenic spots or positions through an information enquiry function in the risk information enquiry module 523, which can acquire who in the perimeter has issued the relevant risk information regarding the enquired objects in order to know in advance risk conditions of the surrounding or the designated places, roads, buildings or positions desired to be known, and thus can be prepared previously to prevent risk and make response. For example, in a case where a vehicle faces a forward direction, a driver only needs to search the geographic position in which he is present and enter the destination in the forward direction, and risk report information on an entire route from his position to the destination can be obtained in the system platform, in order to select the safest and most convenient route to the destination so as to improve safety, convenience and accessibility of travelling.

In this function, an initiative acquisition of the risk prewarning information may be based on LBS circumferential enquiry functions, the user can search persons and things around his own position, thereby can know who is around himself, and can establish friend relations of the user; the user can also know which persons around himself have issued what prewarning information, such that he can know what risk information may exist around his own position to know in advance the risk condition and make a risk response measure early; and the user can also perform a risk information enquiry on a concerned location, a designated place, a running road, a target building or a destination.

In addition, the user can also search persons and things around the designated position. The user can enquire who has issued what prewarning or warning information in and near the designated position. For example, if a certain user is going to a certain region, he may acquire the risk warning information issued by other people in and near the region by searching the region in advance so that the potential risk condition of the region can be known early in order to previously make psychological and physical preparations for risk response or change the schedule or itinerary.

4) The risk level classification module 525 classifies levels of the risk prewarning information issued by the user into totally four levels of "extreme risk", "high risk", "medium risk" and "low risk", and the classified risk prewarning information affixed with a risk level after risk identification and measurement is issued through the platform. In this way, when the user encountering the risk event issues the risk on the platform, the system platform automatically classifies levels of the risk information (four levels), and then carries out the prewarning and issues the prewarning information according to the level of the identified risk. The risk level classification and risk measurement stored in a background database are as follows:

| Type of risks | Description for degree of risks | Risk measurement (possibility of risk) |
| --- | --- | --- |
| extreme risk | an extreme abnormal state or an extreme obstructive condition exist in the content of the information, and the event is described to be absolutely at risk | 95%-100% |
| high risk | a high abnormal state or a high obstructive condition exist in the content of the information, and the event is described to be at risk | 80%-94% |
| medium risk | a medium abnormal state or a medium obstructive condition exist in the content of the information, and the event is described to be at risk but it's not too dangerous | 50%-79% |
| low risk | a low abnormal state or a low obstructive condition exist in the content of the information, and the event is described to have a small risk | 1%-49% |

When the user issues the risk information, the system platform automatically accesses the background database, and performs the corresponding prewarning according to the description of the user for the degree of risk of the risk event.

(4) The Risk Emergency Calling Module 530

This module is used for a user confronted with an extreme risk event to make an urgent response and send the emergency calling information, which includes automatically sending the emergency calling information from the position of the user to an emergency destination (an emergency rescue department, a group of family members, or a group of intimate friends); the risk message asking for help and the position of the user may be sent to the emergency rescue department, the group of family members or the group of intimate friends through one key ask-for-help by describing the risk condition or through one key touch screen ask-for-help of the platform (this function is called "one key alarm"). The risk emergency calling module 530 specifically includes:

a one-key information ask-for-help module 531 for sending urgent risk information and a personal information and location to a target rescue system and a preset contact group by pressing one click key after entering the urgent risk information; and a one-key alarm module 532 for sending personal information and a geographic position information location of a user to the target rescue system and the preset contact group by pressing the one click key.

The one click key includes a 911 bandit alarm system key, a 911 medical rescue system key, a 911 traffic accident system key, a 911 fire alarm system key to be connected to various emergency rescue departments, and a group key to be connected to a mobile terminal of a specific contact. Correspondingly, emergency rescue communication tools includes a 911 bandit alarm call and short message platform, a 911 emergency rescue call and short message platform, a 911 traffic accident alarm call and short message platform and a 911 fire alarm call and short message platform.

Figure 3:
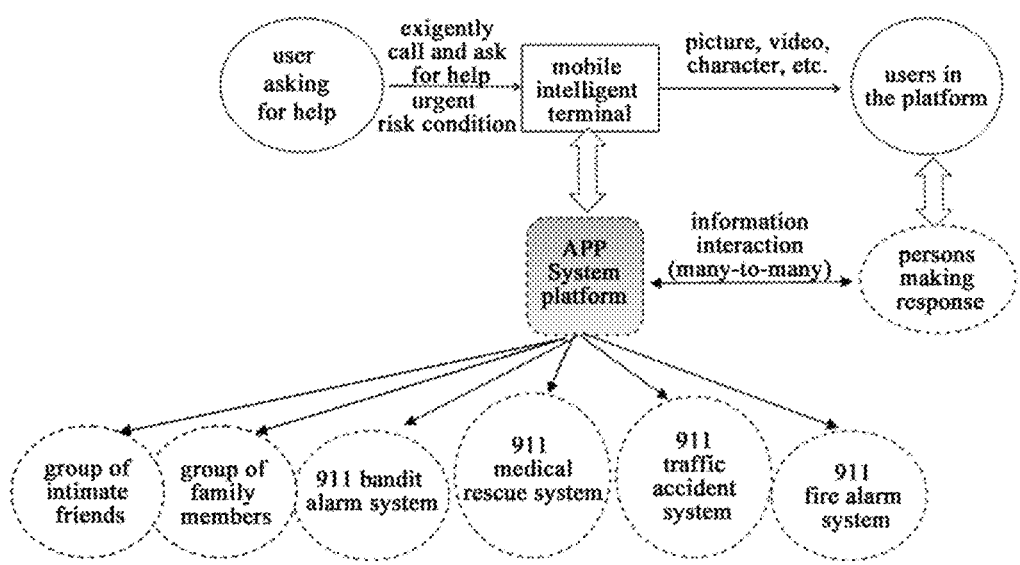
FIG. 3 is a flow diagram of a specific implementation of a risk emergency calling module according to the present invention.

The risk emergency calling module 530 is specifically used in situations where a user facing risk urgent conditions is in urgent need of an emergency rescue, for example, in such urgent risk states in which the user is lost during traveling abroad, he falls out in wilderness of mountains, he falls down into a deep pit due to ground collapse, he falls into a water well or falls down below a sand well cover, and so on. At this time, the one-key information ask-for-help module 531 and the one-key alarm module 532 fitted in the risk emergency calling module 530 can function better, for example, the user may directly click on the 911 bandit alarm system when he encounters thugs, robbery, hijacking, etc.; the user may directly click the 911 medical rescue system when he walks on a road and suddenly feels weak or faints down to the ground; the user may directly click the 911 traffic accident alarm call when he drives on a highway and encounters a serious traffic accident; and the user may directly click the 911 fire alarm system when he encounters inflammation of a building or a house, in order to obtain the most timely rescue from a relevant department. As shown in FIG. 3, in a specific implementation, the risk emergency calling module 530 is mainly used for the following.

1) When the user (referred to as the user asking for help hereinafter) is confronted with an urgent risk condition, he may take pictures or record videos of the risk situations such as a risk environment, a risk event, a risk object and then send the pictures, videos, etc., onto the system platform. At this time, the personal information (name, address, work unit, phone number, etc.) and the geographic position (GPS real-time location, that is, the position of the user asking for help is directly displayed in the map, and a movement locus of the user asking for help after sending the message asking for help can be displayed) of the user asking for help are automatically sent out by the system platform. The user asking for help can also give a literal editable description for the risk information, exigently calls and asks the rescue department and his contact groups in the platform for help through the literal description of the risk event, picture or video, and waits for a response from the system platform.

2) When the user asking for help is in an extreme risk state or is extremely critical, the 911 bandit alarm system, the 911 medical rescue system, the 911 traffic accident system and the 911 fire alarm system in the one-key alarm module 532 can be utilized. At this time, the system platform automatically obtains the geographic position information of the user asking for help, including address, longitude, latitude, map page address link (URL) of the position where the user asking for help is located, based on an external positioning manner (such as GPS) and the risk message asking for help that has been set, and automatically sends the personal information (name, address, work unit, phone number, etc.) of the user asking for help simultaneously.

3) The risk emergency calling module 530 can further include an information or voice forwarding function. After the user has registered his personal information, the system platform will have the detailed personal information of the user, an "emergency calling" related person may be set at the same time, and a plurality of "emergency calling" related persons may be input arbitrarily. There are two necessary options: the first is to enter names, phone numbers and identity card numbers of family members; and the second is the 911 bandit alarm system, the 911 medical rescue system, the 911 traffic accident system and the 911 fire alarm system by one key alarm. When the user makes a behavior of asking for help, the system automatically sends the message asking for help to the registered family members via message or voice; at the same time, the position information (GPS real-time location) of the user and the personal information of the user are forwarded by the one key alarm module 532 to realize a precise and efficiently assisted rescue effect. The advantages of forwarding position information (the registered users also have some personal information) of the user via voice are: firstly, a delay in the rescue in cases where the rescue cannot be performed because the user does not know where he is located or the user cannot clearly tell the position because of tension or obstruction in communication skills, can be avoided; secondly, the direct precise forwarding of the position information via voice shortens communication time with the user, improves efficiency of the rescue, and achieves the effect of one key ask-for-help.

4) The data statistics and summarization module 540 is used to perform big data statistics, summarization and analysis of all the information received on the platform for a manager of the platform to make enquiry and information maintenance.

The data statistics and summarization module 540 specifically comprises:

a data statistics module 541 for the platform to automatically perform classification, statistics and analysis of big data in a background database; and a data summarization module 542 for the platform to automatically perform classification, summarization and analysis of the big data in the background database.

The data statistics and summarization module 540 performs statistics, summarization and analysis of the big data according to sending, reception, dialogue and the like of information of the mobile terminal, and can conduct investigation, analysis and digging on the big data of the users.

What is claimed is:

1. A mobile terminal based platform for emergency calling, risk prewarning, and asking for help by one key, the platform comprises:
   a daily emergency calling module for a user asking for help to send a message asking for help to other users through the platform and to obtain a response from the other users through the platform and establishing a one-to-one response dialogue between the user asking for help and a user making the response;
   a prewarning information receiving and issuing module for issuance, enquiry, reception and dialogue of risk infatuation, and establishing a many-to-many dialogue among users who are concerned with the risk information; and
   a risk emergency calling module for a user confronted with an extreme risk event to send a risk message asking for help to a preset contact group through clicking one key in case of an urgent response and emergency calling.

2. The mobile terminal based platform for emergency calling, risk prewarning, and asking for help by one key according to claim 1, wherein the message asking for help includes personal information of the user, a geographic position of the user and an ask-for-help content, and information of the response dialogue at least includes personal information of the user making the response, a text content of a response message, a geographic position of the user making the response, and a distance information of the user asking for help and the user making the response.

3. The mobile terminal based platform for emergency calling, risk prewarning, and asking for help by one key according to claim 1, wherein the daily emergency calling module comprises:
   a message asking for help sending module for the user asking for help to send the message asking for help to the other users on the platform through the platform, and automatically sending a geographic position of the user asking for help;
   a response message module for the users on the platform to offer a message response to the user asking for help after viewing the message asking for help; and
   a one-to-one dialogue module for the user asking for help and the person making the response to carry out a one-to-one information dialogue on the platform.

4. The mobile terminal based platform for emergency calling, risk prewarning, and asking for help by one key according to claim 1, wherein the prewarning information receiving and issuing module comprises:
   a prewarning information issuing module for the user to issue risk prewarning information through the platform, the risk prewarning information being displayed for the other users to view or enquire after it is issued through the platform;
   a risk information receiving module for the user to receive, on the platform, the risk information issued by other users and the risk prewarning information correspondingly issued by a system platform;
   a risk information enquiry module for all users on the platform to enquire issued risk prewarning information; and
   a many-to-many dialogue module for establishing a many-to-many interactive dialogue with respect to the risk prewarning information.

5. The mobile terminal based platform for emergency calling, risk prewarning, and asking for help by one key according to claim 4, wherein the prewarning information receiving and issuing module further comprises:
   a risk level classification module for classifying levels of the risk prewarning information issued by the user, a classified risk prewarning information affixed with a risk level being issued through the platform.

6. The mobile terminal based platform for emergency calling, risk prewarning, and asking for help by one key according to claim 4, wherein the risk prewarning information includes a picture and/or video of a risk event, a literal description of the risk event, and a geographic position of the risk event.

7. The mobile terminal based platform for emergency calling, risk prewarning, and asking for help by one key according to claim 1, wherein the risk emergency calling module comprises:
- a one-key information ask-for-help module for sending urgent risk information and a personal information and location to a target rescue system and the preset contact group by pressing a one click key after entering the urgent risk information; and
- a one-key alarm ask-for-help module for sending emergency calling information including personal information and a geographic position information location of the user to the target rescue system and the preset contact group to achieve an effect of one-key ask-for-help by an operation of pressing the one click key.

8. The mobile terminal based platform for emergency calling, risk prewarning, and asking for help by one key according to claim 7, wherein the one click key includes a 911 bandit alarm system key, a 911 medical rescue system key, a 911 traffic accident system key, a 911 fire alarm system key to be connected to various alarm systems, and a group key to be connected to a mobile terminal of a specific contact.

9. The mobile terminal based platform for emergency calling, risk prewarning, and asking for help by one key according to claim 1, wherein the platform further comprises a data statistics and summarization module for big data statistics, summarization and analysis of all information received on the platform for a manager of the platform to make enquiry and information maintenance.

10. The mobile terminal based platform for emergency calling, risk prewarning, and asking for help by one key according to claim 9, wherein the data statistics and summarization module specifically comprises:
- a data statistics module for the platform to automatically perform classification, statistics and analysis of big data in a background database; and
- a data summarization module for the platform to automatically perform classification, summarization and analysis of the big data in the background database.

11. The mobile terminal based platform for emergency calling, risk prewarning, and asking for help by one key according to claim 1, wherein the platform further includes a personal information management module for the user to register on the platform and information maintenance.

* * * * *